United States Patent
Farhan et al.

(10) Patent No.: US 6,437,895 B1
(45) Date of Patent: Aug. 20, 2002

(54) DIGITAL OPTICAL TRANSMITTER WITH COMPRESSION

(75) Inventors: Forrest M. Farhan, Duluth; Joseph Graham Mobley, Dunwoody; Leo Montreuil, Atlanta, all of GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/286,189

(22) Filed: Apr. 5, 1999

(51) Int. Cl.[7] .................. H04B 10/04; H04B 10/06; H04B 10/20; H04J 14/02; H04J 14/08
(52) U.S. Cl. .................. 359/180; 359/118; 359/125; 359/137; 359/188; 359/189
(58) Field of Search ................ 359/180, 181, 359/188, 118, 123, 137, 115, 125

(56) References Cited

U.S. PATENT DOCUMENTS

| | | | |
|---|---|---|---|
| 3,995,120 A | 11/1976 | Pachynski, Jr. | 179/15 |
| 4,183,054 A * | 1/1980 | Patisaul et al. | 358/86 |
| 4,759,018 A | 7/1988 | Buchner | 370/112 |
| 4,891,694 A * | 1/1990 | Way | 358/86 |
| 4,994,909 A * | 2/1991 | Graves et al. | 358/86 |
| 5,018,142 A | 5/1991 | Simcoe et al. | 370/112 |
| 5,381,459 A * | 1/1995 | Lappington | 379/56 |
| 5,420,583 A | 5/1995 | Knecht | 341/59 |
| 5,426,527 A * | 6/1995 | Steen et al. | 359/123 |
| 5,479,286 A | 12/1995 | Stalley et al. | 359/125 |
| 5,517,232 A * | 5/1996 | Heidemann et al. | 348/7 |
| 5,563,815 A | 10/1996 | Jones | 364/721 |
| 5,929,896 A * | 7/1999 | Goodman et al. | 348/14 |

FOREIGN PATENT DOCUMENTS

| WO | WO 97/50200 | 12/1997 |
|---|---|---|

* cited by examiner

*Primary Examiner*—Jason Chan
*Assistant Examiner*—M. R. Sedighian
(74) *Attorney, Agent, or Firm*—Hubert J. Barnhardt, III; Kenneth M. Massaroni; Shelley L. Couturier

(57) ABSTRACT

A cable television system (100) includes forward and reverse paths. In the reverse path, an optical transmitter (405), which could be located in an optical node (115), receives an analog information signal from subscriber equipment (130) and transmits in accordance therewith a digital optical signal. The optical transmitter (405) digitizes its incoming signal, compresses the signal, and generates therefrom the digital optical signal. The cable television system (100) also includes an optical receiver (500) for receiving the digital optical signal, decompressing information included in digital optical signal, and recovering therefrom an analog signal representative of the analog information signal. The optical receiver (500) could be included in a hub or headend equipment (105) of the cable television system (100).

14 Claims, 2 Drawing Sheets

DIGITAL OPTICAL TRANSMITTER WITH COMPRESSION

FIELD OF THE INVENTION

This invention relates generally to fiber optic communications, and more specifically to optical transmitters for use in fiber optic communications.

BACKGROUND OF THE INVENTION

Cable television systems typically include a headend section for receiving satellite signals and demodulating the signals to an intermediate frequency (IF) or baseband. The down converted signals are then modulated with radio frequency (RF) carriers and converted to an optical signal for transmission from the headend section over fiber optic cable. Optical transmitters are distributed throughout the cable system, such as at headends, for splitting and transmitting optical signals, and optical receivers are provided in remote locations within the distribution system for receiving the optical signals and converting them to radio frequency (RF) signals that are further transmitted along branches of the system over coaxial cable rather than fiber optic cable. Taps are situated along the coaxial cable to tap off downstream (also referred to as "outbound" or "forward") cable signals to subscribers of the system.

Various factors influence the ability to accurately transmit and receive optical signals within a cable television system. As the length of fiber optic cable within a system increases, for example, signal losses also increase. Furthermore, temperature fluctuations, which cause variation in the optical modulation index of the optical transmitter, can result in variation of the radio frequency (RF) output level of the optical receiver. Signal distortions can be caused by non-linearities in the laser and photodiode of the optical transmitter.

Although these problems can be mitigated by employing expensive techniques, e.g., decreasing fiber lengths between optical nodes, such techniques may prohibitively increase costs to both subscribers and service providers. Thus, what is needed is a better way to provide reliable and accurate transmission of optical signals within a cable television system.

DETAILED DESCRIPTION OF A PREFERRED EMBODIMENT

Figure 1:
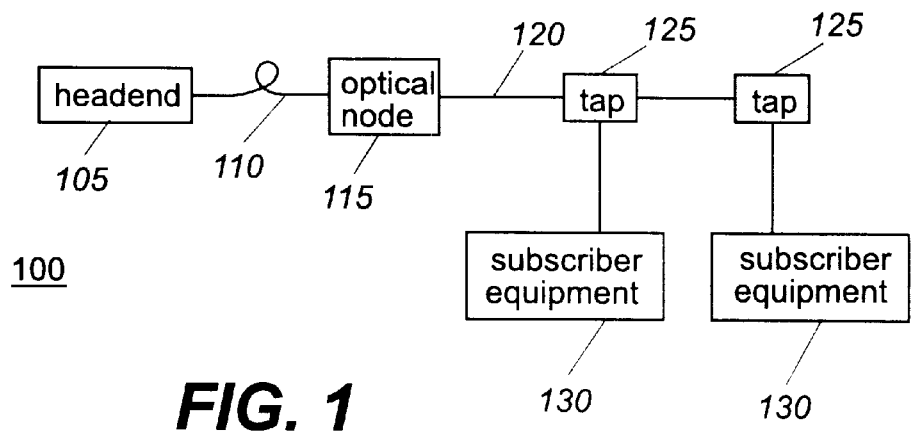
FIG. 1 is a block diagram of a cable television system in accordance with the present invention.

FIG. 1 shows a communications system, such as a cable television system 100 having both forward and reverse paths, i.e., having the ability to communicate downstream in the forward direction and upstream in the reverse direction. The cable television system 100 includes a headend 105 for receiving satellite signals that are demodulated to baseband or an intermediate frequency (IF). The baseband signal is then converted to cable television signals that are routed throughout the system 100 to subscriber equipment 130, such as set top decoders, televisions, or computers, located in the residences or offices of system subscribers. The headend 105 can, for instance, convert the baseband signal to an optical signal that is transmitted over fiber optic cable 110, in which case a remotely located optical node 115 converts the optical signal to an electrical radio frequency (RF) signal for further transmission through the system 100 over coaxial cable 120. Taps 125 located along the cable 120 at various points in the distribution system split off portions of the RF signal for routing to subscriber equipment 130 coupled to subscriber drops provided at the taps 125.

The system 100, as mentioned, also has reverse transmission capability so that signals, such as data, video, or voice signals, generated by the subscriber equipment 130 can be provided back to the headend 105 for processing. The reverse signals travel through the taps 125 and any nodes 115 and other cable television equipment, e.g., reverse amplifiers, to the headend 105. In the configuration shown in FIG. 1, RF signals generated by the subscriber equipment 130 travel to the node 115, which converts the RF signals to optical signals for transmission over the fiber optic cable 110 to the headend 105.

Figure 2:
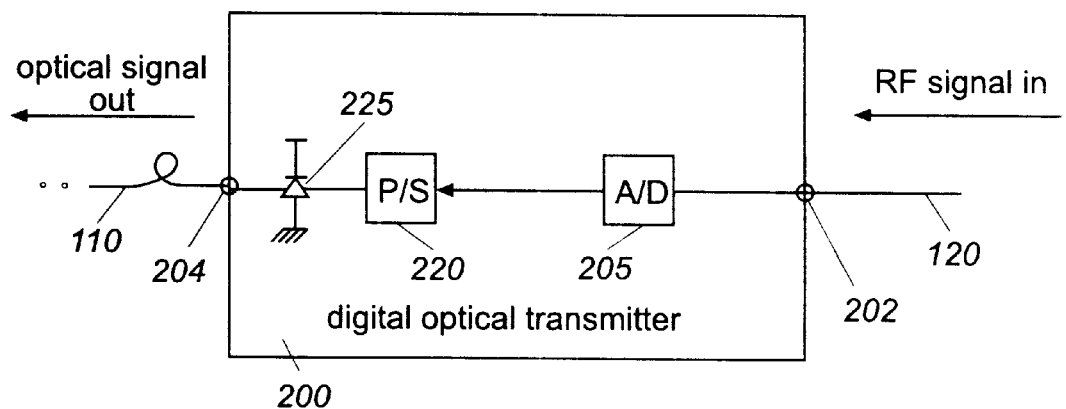
FIG. 2 is an electrical block diagram of an optical transmitter included in the cable television system of FIG. 1 in accordance with the present invention.

Referring to FIG. 2, a digital reverse transmitter 200 is provided for transmitting digital optical signals to the headend 105 in the reverse direction. The transmitter 200 can, for instance, be included within the optical node 115, although other locations within the cable television system 100 may also include the digital reverse transmitter 200 of the present invention. The transmitter 200 receives, at an input 202, an analog information signal that is representative of one or more reverse RF signals from the subscriber equipment 130. At its output 204, the transmitter 200 provides a digital optical signal that is generated in accordance with the analog information signal.

More specifically, the digital reverse transmitter 200 includes an analog-to-digital (A/D) converter 205 for converting the analog input to a digital signal, i.e., a digital word comprising a particular number of bits, in a conventional manner. The resolution of the A/D converter 205, of course, is dependent upon transmitter design parameters. The digitized signal is then coupled to a parallel-to-serial (P/S) converter, or a serializer 220, which receives the parallel inputs representative of the digitized signal and converts the inputs into a serial bit stream. A laser diode 225 is then driven to generate an optical signal in accordance with the serial bit stream. It will be appreciated that the serializer 220 can also include a driver for driving the laser diode 225 and frame encoding circuitry for encoding the serialized digital signal into frames of data.

Figure 3:
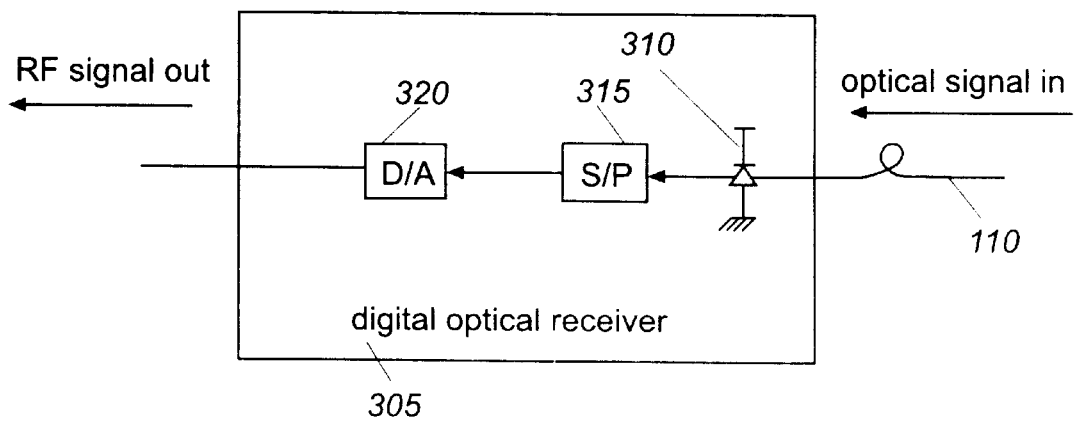
FIG. 3 is an electrical block diagram of an optical receiver included in the cable television system of FIG. 1 in accordance with the present invention.

FIG. 3 is a block diagram of an optical receiver 305 for receiving the digital optical signal transmitted by the optical transmitter 200. The receiver 305 can be, for instance, located in the headend 105, although other locations, such as any intervening hubs or nodes, may also employ the receiver 305. The receiver 305 includes a detector, such as a photodiode 310, for receiving the digital optical signal transmitted over the fiber optic cable 110 and generating therefrom a serial stream of electrical pulses in accordance with the optical signal. The output signals provided by the photodiode 310 are coupled to a serial-to-parallel (S/P) converter 315 for generating therefrom a set of parallel outputs corresponding to a digital word. The receiver 305 further includes a digital-to-analog (D/A) converter 320 for converting the signal provided at its digital input to an analog signal in a known manner.

In conventional cable television systems, optical links in the reverse path use amplitude modulation to directly modulate a laser generating a reverse optical signal. As a result, RF output level of the optical receiver is directly dependent upon the optical modulation index (OMI), which in turn is directly related to the RF drive current, the laser threshold current, and the laser bias current of the laser located in the transmitter. Since the laser bias and threshold currents vary with temperature, which in turn causes temperature variations of the OMI, the RF output level of the optical receiver also varies with temperature. However, the laser within the transmitter 200 of the present invention is digitally modulated so that the RF level information is encoded according to a bit stream; as a result, variations in the OMI, the laser bias current, the laser threshold current, and the temperature do not affect RF output levels of the optical receiver 305.

Prior art optical transmission that use AM modulation also result in a system in which the linearity of the received optical signal is directly dependent upon the linearity of the transmitting laser and the receiving photodiode. Therefore, non-linearities of those devices can greatly degrade the performance of the reverse path system. Additionally, the non-linear conversion processes of lasers and photodiodes in conventional systems vary with temperature, thus further degrading the performance. Conversely, the digital optical system, i.e., the digital optical transmitter 200 and the digital optical receiver 305, of the present invention only generates and resolves two amplitude levels rather than a continuum of levels. As a result, linearity requirements of the laser and photodiode are significantly reduced, which results in better performance and less expense.

Still another advantage of the digital optical transmitter 200 and receiver 305 of the present invention is that the cable system 100 can, without significant cost or performance penalties, employ an architecture in which fiber stretches deeper into the system 100. As a cable television signal travels along a fiber optic cable 110, the signal-to-noise ratio decreases as a result of laser noise, Rayleigh backscattering, photodiode shot noise, receiver amplifier noise, unmodulated Fabry-Perot sporadic noise, and post amplifier intrinsic noise. Conventionally, this problem is mitigated by driving the transmitter laser with more power and/or increasing the receive sensitivity of the receiver photodiode at great expense. However, this need not be done in a system 100 according to the present invention since the noise sources and corresponding signal degradation resulting from increased fiber lengths does not affect recovery of information to the same extent as in prior art systems.

Figure 4:
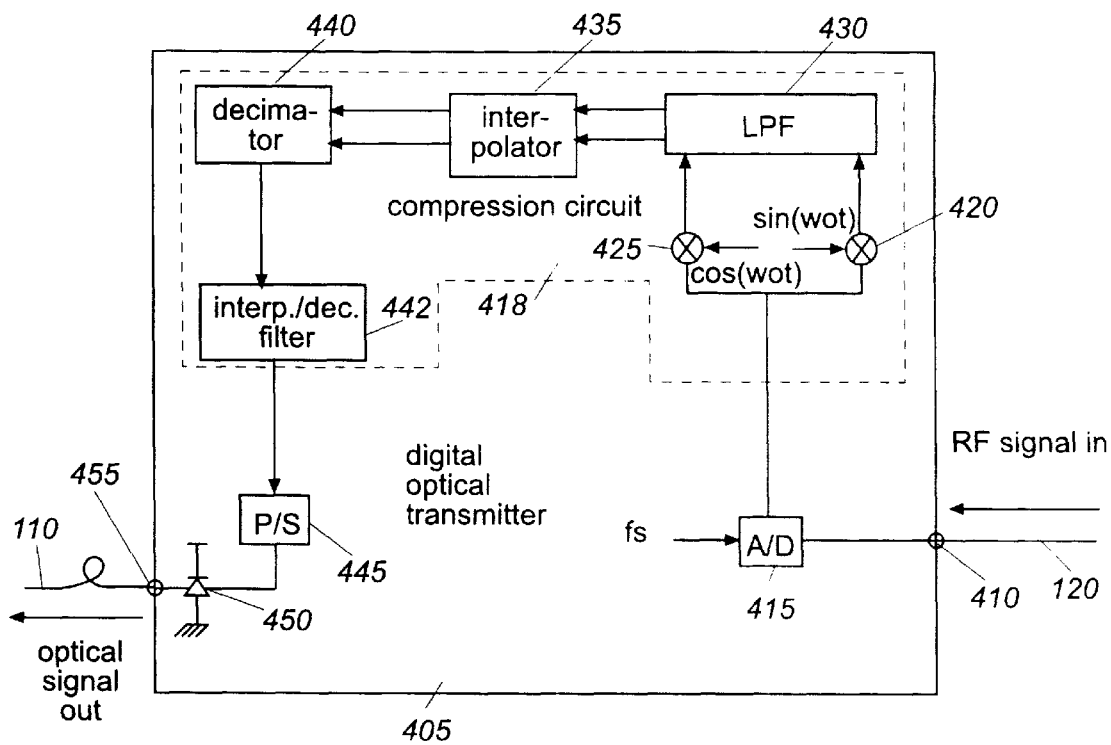
FIG. 4 is an electrical block diagram of an optical transmitter that includes data compression circuitry in accordance with the present invention.

Referring next to FIG. 4, a modified digital optical transmitter 405 according to the present invention is shown. The modified transmitter 405 includes a data compression circuit 418 so that digital optical data transmitted from the transmitter 405 can be sent at a lower data rate in comparison with the transmitter 200 of FIG. 2, while retaining all of the same advantages. The digital optical transmitter 405 includes an input port 410 for receiving the analog information signal. The analog information signal is sampled by the A/D converter 415 at a sampling rate, $f_s$. The digital information signal generated by the A/D converter 415 is then compressed.

More specifically, alternating digital words transmitted by the A/D converter are provided down different paths to first and second mixers 420, 425, respectively. The first and second mixers 420, 425 separate the incoming digital signal into first and second signals comprising, respectively, real and imaginary components at baseband. The first and second signals are included within a frequency range that is passed by a low pass filter 430, and the first and second signals are then processed by an interpolator 435 that increases the sampling rate by a factor p. Thereafter, a decimator decreases the sampling rate at which the first and second signals are sampled by a factor q. Preferably, q>p so that the compression circuit 418 effectively decreases the data rate of the digital signal that was supplied at the output of the A/D converter 415. The compressed digital signal is filtered by an interpolation/decimation filter 442 that may be included within the compression circuit 418.

The compressed digital signal is then converted by a serializer 445 into a serial bit stream that drives a laser diode 450 to emit a digital optical signal having a lower data rate than that transmitted by the digital optical transmitter 200 of FIG. 2. The data rate of the digital optical signal transmitted by the transmitter 405 could be less than or equal to 622 Mbps, for instance, while the data rate of the signal generated by the transmitter 200 that does not include data compression would more likely be greater than or equal to 1 Gbps.

Details of the data compression within the transmitter 405 may be better understood with reference to the following information. The A/D converter 415, as mentioned, samples the incoming signal at a sampling frequency of $f_s$ and provides an output of M bits in parallel to the compression circuit 418. The sampling frequency is preferably a multiple of a carrier frequency that is substantially at the midpoint of the reverse path frequency spectrum and that also should be at least two times the upper frequency that defines the reverse path frequency spectrum.

The aggregate data rate into the compression circuit 418 is therefore $M*f_s$. The M parallel bits leave the compression circuit 418 at a different frequency, $f_c$. Inside the compression circuit 418, the samples are multiplied by $e^y$ by the mixers 420, 425, where $e^y = \cos(\omega_o t) + j\sin(\omega_o t)$, where $y = j\omega_o t$, and where j is the imaginary multiplier, or function, so that the incoming information is separated into real and imaginary components at baseband. The effect of the complex multiplication in the time domain is a spectrum shift in the frequency domain by the amount $f_o$, where $\omega_o = 2\pi f_o$. Generally, $f_o$ should be equivalent to the lower frequency defining the reverse path spectrum.

When the reverse band of the cable television system 100 is in the range of about five (5) MHz to forty (40) MHz andfs is approximately ninety (90) MHz, the frequency shifted spectrum comprises a spectrum centered at zero (0) MHz and ranging from about −17.5 MHz and +17.5 MHz. The finite impulse response low pass filter 430 then rather sharply rejects all frequencies greater than a particular cutoff frequency that is preferably equal to the upper frequency, e.g., 40 MHz, of the reverse path spectrum minus $f_o$. For example purposes, $f_o = 5$ MHz.

The filtered signal is up-sampled by a factor p by the interpolator 435, down-sampled by a factor q by the decimator 440, and filtered to complete the interpolation/decimation function. The achievable decimation factor is from $M*f_s$ to $A*f_c$, so the signal provided by the compression circuit 418 can be slowed down to about seventy (70) MSps (megasamples per second), or more practically seventy-five (75) MSps. If the sampling frequency of the A/D converter 415 is ninety (90) MHz, this compression scheme can provide a 20% to 25% percent reduction in data rate, with p and q equal to five (5) and six (6), respectively. It will be appreciated that the interpolation and decimation factors can vary, however; p and q could instead be seven (7) and (9), respectively, or three (3) and four (4), respectively, for example.

Figure 5:
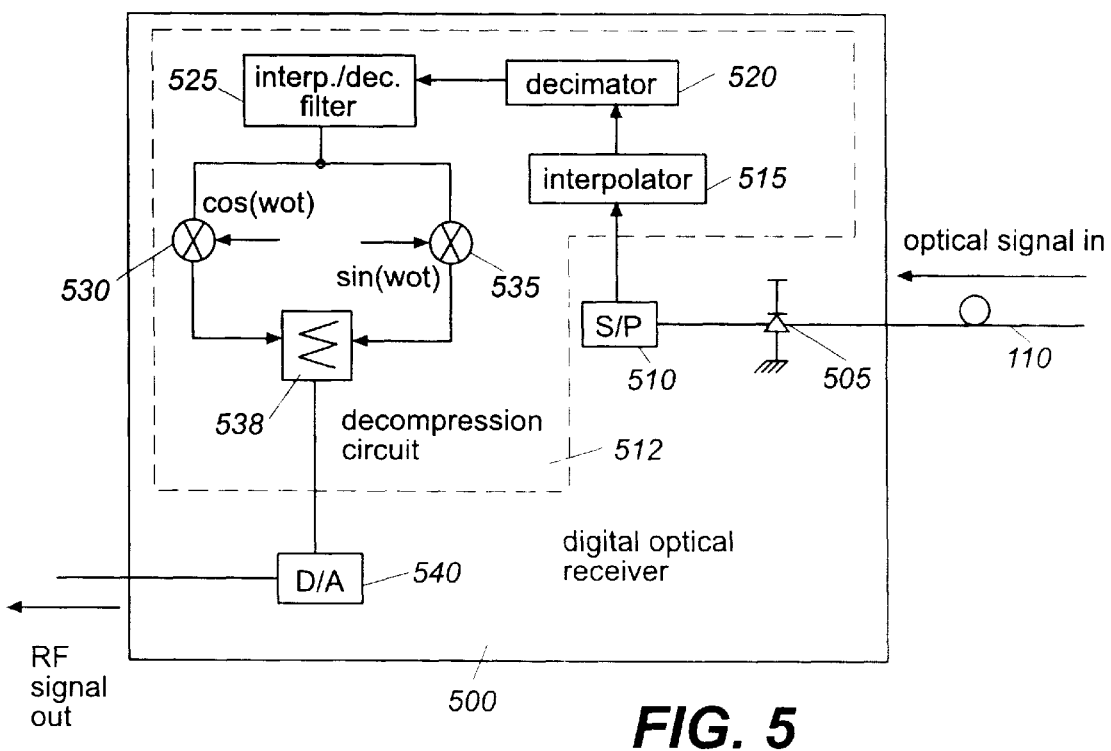
FIG. 5 is an electrical block diagram of an optical receiver that includes data decompression circuitry in accordance with the present invention.

Referring next to FIG. 5, a digital optical receiver 500 having decompression circuitry 512 is shown. The receiver 500 includes a detector 505 for receiving the compressed digital optical signal transmitted by the transmitter 405. The detector 505, which can be a photodiode, generates a compressed digital electrical signal in the form of a stream of pulses that are provided to the decompression circuit 512.

The decompression circuit 512 comprises an interpolator 515 for increasing the pulse rate by a factor q then a decimator 520 for decreasing the pulse rate by a factor p. The pulse stream that is transmitted at the faster rate is then filtered by another interpolation/decimation filter 525. Alternate pulses of the pulse stream are then provided to mixers 530, 535, which effectively shift the signal in the frequency domain back into the cable television system reverse path band, e.g., 5–40 MHz. The output signals from the mixers 530, 535 are summed by a complex summer 538 and provided to a D/A converter 540, which outputs an analog electrical signal that is representative of the analog information signal originally received by the transmitter 405.

In summary, the reverse digital transmission system described above provides one or more reverse signals without many of the problems present in prior art systems. Additionally, signals can be compressed prior to digital optical transmission so that the communication channel is more efficiently used. As a result, information can be sent from subscribers to the headend in a more reliable, more efficient, and less expensive manner.

What is claimed is:

1. A communications system including forward and reverse paths for providing signals, the communications system comprising:
   an optical transmitter for receiving an analog information signal and transmitting in accordance therewith a compressed digital optical signal, the optical transmitter comprising:
      an analog-to-digital (A/D) converter for converting the analog information signal to a digital information signal;
      a compression circuit coupled to the A/D converter for generating a compressed digital information signal, wherein the compression circuit comprises:
         first and second mixers for alternatively mixing the digital information signal to generate first and second signals at, respectively, first and second frequencies;
         a low pass filter for filtering the first and second signals;
         an interpolator coupled to the lowpass filter to generate an increased number of signal samples of the first and second signals; and
         a decimator coupled between the interpolator and the serializer for generating a decreased number of signal samples of the first and second signals;
      a serializer for converting the compressed digital information signal to a serial signal; and
      a laser diode driven by the serializer to generate the compressed digital optical signal,
   wherein the compressed digital optical signal results in transmission of the signal at a lower data rate.

2. The communications system of claim 1, wherein the factor by which the interpolator increases the number of signal samples is less than the factor by which the decimator decreases the number of signal samples.

3. The communications system of claim 2, wherein the reverse path within the communications system is within a frequency spectrum defined by a lower frequency and an upper frequency.

4. The communications system of claim 3, wherein a A/D converter is characterized by a sampling rate at which it samples the analog information signal.

5. The communications system of claim 4, wherein the sampling rate of the A/D converter is a multiple of a carrier frequency halfway between the upper frequency and the lower frequency.

6. The communications system of claim 4, wherein:
   the lower frequency is approximately five (5) MHz;
   the upper frequency is approximately forty (40) MHz; and
   the A/D converter samples at approximately ninety (90) MHz.

7. The communications system of claim 4, wherein the first and second mixers split the digital information signal into real and imaginary components at baseband.

8. The communications system of claim 7, wherein the real and imaginary components are centered at zero (0) MHz.

9. The communications system of claim 7, wherein the low pass filter is characterized by approximately twelve (12) decibles (dB) of loss at a frequency between about 17.5 MHz and 27.5 MHz.

10. The communications system of claim 7, wherein the interpolator increases the sampling rate by a factor ranging from three (3) to sever (7), and wherein the decimator decreases the sampling rate by a factor ranging from four (4) to nine (9).

11. A digital optical transmitter included in a reverse path of a cable television system that also includes subscriber equipment for generating information and headend equipment for receiving and processing the information, the digital optical transmitter comprising:
   an analog-to-digital (A/ID) converter for converting an analog information signal, comprising the information generated by the subscriber equipment, to a digital information signal by sampling the analog information signal at a sampling rate;
   a compression circuit for compressing the digital information signal, the compression circuit comprising:
      first and second mixers for separating the digital information signal into real and imaginary components at baseband;
      a low pass filter for filtering signals to provide outputs of first and second signals comprising the real and imaginary components of the digital information signal;
      an interpolator for increasing the sampling rate at which the first and second signals are sampled; and
      a decimator for decreasing the sampling rate at which the first and second signals are sampled, wherein the sampling rate is decreased by a factor that is greater than the factor at which the interpolator increases the sampling rate, and wherein the decimator provides an output comprising a digital signal transmitted at a reduced data rate;
   a serializer for converting the digital signal transmitted at the reduced data rate to a serial bit stream; and
   a laser diode that is driven by the serial bit stream to generate a digital optical signal that is transmitted in the reverse path of the cable television system.

12. In a communications system including forward and reverse paths for providing signals, the communications system comprising:
   a digital optical receiver for receiving a compressed digital optical signal and for providing a decompressed analog signal, the digital optical receiver comprising:
      a detector for generating a stream of pulses that is indicative of the compressed digital optical signal;
      a decompression circuit for decompressing the stream of pulses, wherein the decompression circuit comprises:
         an interpolator to generate an increased rate of the stream of pulses;
         a decimator to generate a decreased rate of the stream of pulses;
         first and second mixers for alternatively mixing the pulse stream; and
         a summer for providing a decompressed stream of pulses;
      a digital-to-analog (D/A) converter for providing the decompressed analog signal in accordance with the stream of pulses.

13. The communications system of claim 12, the communications system further comprising:
   a digital optical transmitter for receiving an analog signal and for transmitting in accordance therewith the compressed digital optical signal to the digital optical receiver, the digital optical transmitter comprising:
      an analog-to-digital (A/D) converter for converting the analog signal to a digital signal by sampling the analog signal at a sampling rate;
      a compression circuit for compressing the digital signal;
      a serializer for converting the compressed digital signal transmitted at a reduced data rate to a serial bit stream; and
      a laser diode that is driven by the serial bit stream to generate the compressed digital optical signal.

14. The communications system of claim 13, wherein the compression circuit comprises:
   first and second mixers for alternatively mixing the digital signal to generate first and second signals at, respectively, first and second frequencies;
   a low pass filter for filtering the first and second signals;
   an interpolator coupled to the low pass filter to generate an increased number of signal samples of the first and second signals; and
   a decimator coupled between the interpolator and the serializer for generating a decreased number of signal samples of the first and second signals.

* * * * *

UNITED STATES PATENT AND TRADEMARK OFFICE
CERTIFICATE OF CORRECTION

PATENT NO. : 6,437,895 B1
DATED : August 20, 2002
INVENTOR(S) : Farhan et al.

It is certified that error appears in the above-identified patent and that said Letters Patent is hereby corrected as shown below:

Column 3,
Line 63, delete "rate,$f_s$." and insert therefore -- rate,$fs$. --

Column 4,
Line 40, delete "where $e^y = cos(\omega_o t) + j\, sin(\omega_o t),$" and insert therefore -- where $e^y = cos(\omega_o t) + jsin(\omega_o t)$, --
Line 50, delete "andfs" and insert therefore -- and $f_s$ --
Line 63, delete "$A*f_o$" and insert therefore -- $M*f_o$ --

Column 5,
Line 67, delete "signal" and insert therefore -- signals --

Column 6,
Line 9, delete "a" between "wherein" and "A/D" and insert therefore -- the --
Line 28, delete "decibles" and insert therefore -- decibels --
Line 32, delete "sever" and insert therefore -- seven --
Line 40, delete "(A/ID)" and insert therefore -- (A/D) --

Signed and Sealed this

Tenth Day of December, 2002

JAMES E. ROGAN
*Director of the United States Patent and Trademark Office*